(12) United States Patent
Nagasawa et al.

(10) Patent No.: US 8,532,062 B2
(45) Date of Patent: Sep. 10, 2013

(54) WIRELESS COMMUNICATION APPARATUS

(75) Inventors: Chizuko Nagasawa, Yokohama (JP);
Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 376 days.

(21) Appl. No.: 12/919,436

(22) PCT Filed: Feb. 23, 2009

(86) PCT No.: PCT/JP2009/053224
§ 371 (c)(1),
(2), (4) Date: Aug. 25, 2010

(87) PCT Pub. No.: WO2009/107588
PCT Pub. Date: Sep. 3, 2009

(65) Prior Publication Data
US 2011/0007714 A1    Jan. 13, 2011

(30) Foreign Application Priority Data

Feb. 27, 2008   (JP) ................................ 2008-045836

(51) Int. Cl.
*H04W 4/00*        (2009.01)
(52) U.S. Cl.
USPC ........................................................ 370/332
(58) Field of Classification Search
USPC ........................................................ 370/332
See application file for complete search history.

(56) References Cited

U.S. PATENT DOCUMENTS 7,440,430 B1 * 10/2008 Jagadeesan et al. .......... 370/331
7,574,169 B2   8/2009 Koh 2006/0045138 A1   3/2006 Black et al.
2006/0077994 A1 * 4/2006 Spindola et al. .............. 370/412
2007/0091844 A1 * 4/2007 Huang et al. .................. 370/331

FOREIGN PATENT DOCUMENTS

| JP | 2001-045560 A | 2/2001 |
| JP | 2006-238445 A | 9/2006 |
| KR | 20050023090 | 3/2005 |
| WO | WO 2006/044696 | 4/2006 |

OTHER PUBLICATIONS 10-2010-7018997, mail date Dec. 23, 2011, Korean Office Action and English Translation.

* cited by examiner

*Primary Examiner* — Mark Rinehart
*Assistant Examiner* — Maharishi Khirodhar
(74) *Attorney, Agent, or Firm* — Workman Nydegger

(57) ABSTRACT

In order to perform handover from a first wireless communication network to a second wireless communication network, a handover control unit obtains a handover preparation time Tb to handover, respective delay times Tddn1 and Tddn2 of the wireless communication networks, and the jitter buffer monitoring unit monitors a packet amount Tc in the jitter buffer and a type of the packet to be reproduced. The application is controlled, in case of voice packets, so as to reproduce the voice packets at a reproduction speed calculated based on the handover preparation time Tb, the delay times Tddn1 and Tddn2, the packet amount Tc in the jitter buffer and an elapsed time after start of handover preparation and, in case of non-voice packets, so as to control the non-voice packets at a reproduction speed in accordance with a silent period thereof. Thereby, it is possible to perform handover to a different wireless communication network without deteriorating reproduction quality and real-time property.

18 Claims, 15 Drawing Sheets

FIG. 4
(a)
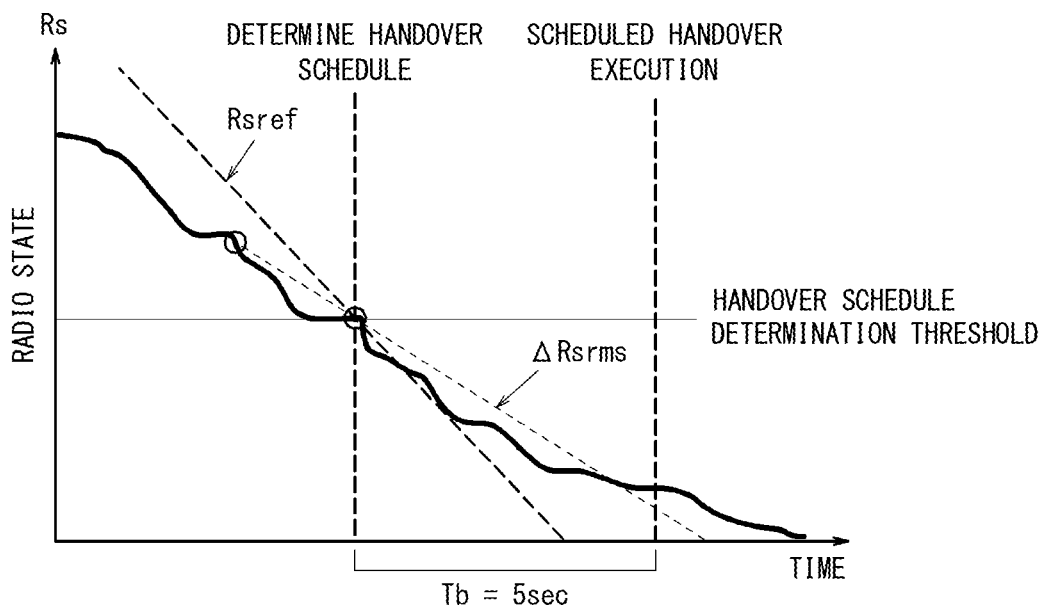
(b)
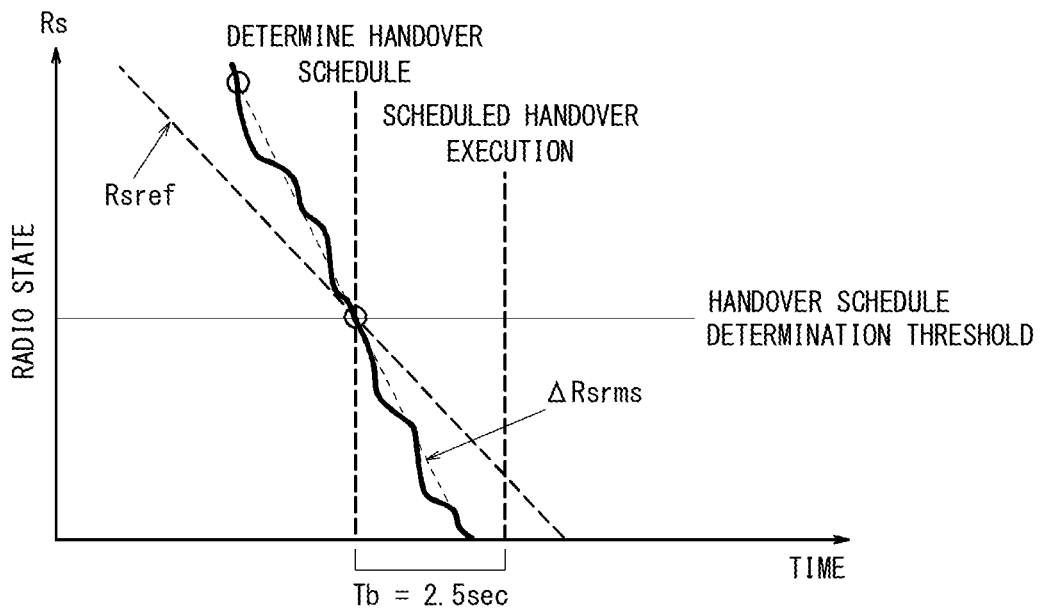

WIRELESS COMMUNICATION APPARATUS

CROSS REFERENCE TO RELATED APPLICATION

This application claims priority to and the benefit of Japanese Patent Application No. 2008-45836 filed on Feb. 27, 2008, the entire contents of which are incorporated herein by reference.

TECHNICAL FIELD

The present invention relates to wireless communication apparatuses capable of performing handover between different wireless communication networks.

BACKGROUND ART

In recent years, IETF (Internet Engineering Task Force) has been considering an IP mobility scheme for seamless movement and capable of performing handover between a plurality of different wireless communication networks, such as a cellular phone network, a wireless LAN and the likes, in order to achieve ubiquitous environment. As a specific protocol of the IP mobility scheme, there are Mobile IPv4 and Mobile IPv6 (which are abbreviated as Mobile IP, hereinafter) for supporting movement of each individual communication terminal, and NEMO (Network Mobility) for supporting mobility of a network as a unit.

Incidentally, when an application (hereinafter, abbreviated as APP arbitrarily) such as VoIP having a real-time property is executed via the wireless communication network, an allowable bandwidth of a wireless communication path changes depending on a propagation environment such as fading, and arrival intervals of packets received by the communication terminal are changed in accordance with a change of the allowable bandwidth.

For this reason, it is generally performed to provide the communication terminal with a jitter buffer so as to first store received packets in the jitter buffer and then read out the packets from the jitter buffer and reproduce the packets at intervals based on the application. Thereby, it absorbs deviation in the packets, that is, displacement of reproduction intervals of packets caused by displacement (jitter) of the arrival intervals of the packets, so as to prevent deterioration of reproduction quality such as reproduced sound quality and the likes. Moreover, when there is no packet in the jitter buffer since the jitter is large, and therefore silence occurs, or when too many packets are received in a short period to be stored in the jitter buffer, the communication terminal changes a reproduction speed, discards received packets, or changes a size of the jitter buffer.

On the other hand, a downlink absolute delay time of a packet received by the communication terminal, that is, a time (delay time) required for a packet transmitted from a counterpart communication terminal to be received via the wireless communication network varies depending on wireless communication networks. Thus, if the communication terminal is a wireless communication apparatus which is moving and performs handover to a different wireless communication network, and when the downlink absolute delay time of a handover destination is longer than that of a handover source, for example, it causes a blank period not receiving a packet according to the difference between the downlink absolute delay times.

In such a case, if the blank period not receiving the packet is longer than a time required to read out a last packet (that is, a jitter buffer standard delay time), received from the wireless communication network of the handover source, from the jitter buffer when packets are read out from the jitter buffer at certain intervals based on an APP and reproduced at a certain reproduction speed, for example, there is no packet in the jitter buffer for a period of such exceeding time. As a result, since reproduction of packets is not performed at least during this period, it causes silence and deteriorates reproduction quality.

FIG. 12 shows diagrams for explaining a control method of the jitter buffer in the above case. In FIG. 12, (a) shows the number of packets received by the jitter buffer for a unit period, (b) shows the reproduction speed (read-out intervals) of packets from the jitter buffer, and (c) shows the number of packets in the jitter buffer. FIG. 13 shows flows of the packets in that case. In FIG. 13, "Transmission", "Reception" and "Reproduction" represent a transmission timing of a packet by the counterpart communication terminal, a reception timing of the packet received by the jitter buffer of the wireless communication apparatus, and a reproduction timing of the packet (timing to read out the packet from the jitter buffer) by the wireless communication apparatus, respectively. Here, it is assumed that there is no deviation in received packets (displacement of arrival intervals) either at a wireless communication network A of the handover source and a wireless communication network B of the handover destination.

As obvious from FIG. 12 and FIG. 13, no packet is reproduced for a time Tab={(TddnB−TddnA)−Tn}, if a downlink absolute delay time TddnB of the wireless communication network B of the handover destination is longer than a downlink absolute delay time TddnA of the wireless communication network A of the handover source and the difference (TddnB−TddnA) is longer than a jitter buffer standard delay time Tn, which is applied to received packets when there is a standard number of packets in the jitter buffer. In such a case, moreover, since packets are reproduced immediately after being received from the wireless communication network B of the handover destination, it is not possible to absorb jitter.

In order to improve such a defect at handover, there is suggested a method, for example, to monitor a reception condition of packets and, if packets are not received at normal reception intervals, to control reading out of the packets from the jitter buffer, that is, to control the reproduction speed of the packets (see Patent Document 1, for example).

FIG. 14 shows diagrams illustrating a control method of the jitter buffer disclosed in Patent Document 1. In FIG. 14, in the same manner as FIG. 12(a) to (c), (a), (b) and (c) show the number of packets received by the jitter buffer in a unit time, the reproduction speed, and the number of packets in the jitter buffer, respectively. FIG. 15 shows flows of the packets in such a case.

As shown in FIG. 14 and FIG. 15, if packets cannot be received at previous reception intervals such as when handover is performed from the wireless communication network A with the downlink absolute delay time TddnA to the wireless communication network B with the downlink absolute delay time TddnB longer than TddnA, the reproduction speed of packets in the jitter buffer is gradually reduced in accordance with increase in the reception intervals. When the reception intervals return to normal intervals thereafter, the reproduction speed is controlled to gradually increase to the normal reproduction speed in accordance with the number of packets in the jitter buffer.

Patent Document 1: Japanese Patent Laid-Open No. 2006-238445

SUMMARY OF INVENTION

Technical Problem

However, the jitter buffer control method disclosed in Patent Document 1, controls only the reproduction speed of packets currently stored in the jitter buffer to be gradually reduced when the packets cannot be received at previous reception intervals. Therefore, it is concerned that, when the downlink absolute delay time TddnB of the handover destination is relatively long, the reproduction speed is slowed down too much, causing deterioration of the reproduction quality. Accordingly, for VoIP, for example, since the reproduction speed dramatically changes from an original voice speed, it significantly deteriorates quality of reproduced voice and makes hard for a user to hear. In addition, if a silent period is extended longer than a certain period because of slowing down of the reproduction speed, it may give the user a sense of unease.

Although FIG. 14 and FIG. 15 show an exemplary control method when silence and the like caused by no packet in the jitter buffer does not occur, it is practically unknown how long the reception intervals of the packets will be. It is thus concerned that, depending on the jitter buffer standard delay time Tn or the downlink absolute delay time TddnB of the handover destination, the jitter buffer may become empty causing silence and the likes. Although the jitter buffer standard delay time Tn may be set longer so as to prevent silence, this causes delay in reproduction of the packet from the counterpart terminal in VoIP, for example, which loses the real-time property.

In consideration of such problems, it is an object of the present invention to provide wireless communication apparatuses capable of performing handover to a different wireless communication network without deteriorating the reproduction quality and the real-time property.

Solution To Problem

In order to achieve the above object, a wireless communication apparatus according to a first aspect includes:

a wireless communication unit for performing wireless communication by connecting to a first wireless communication network and a second wireless communication network different from the first wireless communication network;

an execution unit for executing an application for real-time communication, which includes data of a first type and data of a second type, via the wireless communication unit;

a communication quality obtaining unit for obtaining communication quality of a wireless link of the first wireless communication network during execution of the application by connecting to the first wireless communication network;

a determination unit for determining whether to start handover preparation from the first wireless communication network to the second wireless communication network based on the communication quality obtained by the communication quality obtaining unit;

an estimation unit, when the determination unit determines to start handover preparation during execution of the application, for estimating a handover preparation time to start handover based on the communication quality obtained by the communication quality obtaining unit;

a measuring unit, when the determination unit determines to start handover preparation, for measuring a delay time of each of the first wireless communication network and the second wireless communication network; and a control unit for controlling reproduction of the application executed by the execution unit, wherein the execution unit includes a jitter buffer for absorbing jitter of received data and a jitter buffer monitoring unit for monitoring an amount of data in the jitter buffer and a type of data to be reproduced from the jitter buffer, and the control unit controls the application, if the type of the data monitored by the jitter buffer monitoring unit is the first type, to reproduce the data of the first type at a reproduction speed calculated based on the handover preparation time estimated by the estimation unit, the delay time of each of the first wireless communication network and the second wireless communication network measured by the measuring unit, the amount of the data in the jitter buffer monitored by the jitter buffer monitoring unit and an elapsed time after start of the handover preparation and, if the type of the data monitored by the jitter buffer monitoring unit is the second type, to reproduce the data of the second type at a reproduction speed in accordance with a continuous period of the data.

A second aspect of the present invention is that, in the wireless communication apparatus according to the first aspect, the control unit compares the delay time of the first wireless communication network and the delay time of the second wireless communication network and, if the delay time of the second wireless communication network is longer than the delay time of the first wireless communication network by a predetermined time or longer, slows down the reproduction speed of the data of the first type.

A third aspect of the present invention is that, in the wireless communication apparatus according to the second aspect, the control unit slows down the reproduction speed of the data of the first type after starting handover preparation.

A fourth aspect of the present invention is that, in the wireless communication apparatus according to the second aspect, the control unit, if the type of the data monitored by the jitter buffer monitoring unit is the first type, calculates the reproduction speed such that the amount of data in the jitter buffer becomes zero at a time to start receiving data from the second wireless communication network.

A fifth aspect of the present invention is that, in the wireless communication apparatus according to the second aspect, the control unit, if the type of the data monitored by the jitter buffer monitoring unit is the second type, reproduces the data by extending the continuous period of the data depending on the continuous period.

Advantageous Effects on Invention

In order to perform handover from the first wireless communication network to the second wireless communication network, the wireless communication apparatus according to the present invention obtains in advance the handover preparation time and the delay time of each of the first wireless communication network and the second wireless communication network. Then, the amount of the data in the jitter buffer and the type of the data to be reproduced are monitored. If the type of the data is the first type, an application is controlled so as to reproduce the data at the reproduction speed calculated based on the handover preparation time, the delay time of each of the wireless communication networks, the amount of the data in the jitter buffer and the elapsed time after start of handover preparation. If the type of the data is the second type, the application is controlled so as to reproduce the data at a reproduction speed in accordance with the continuous period. Accordingly, if the application is a VoIP application, for example, it is defined that the data of the first type are voice packets and the data of the second type are non-voice packets. Thereby, it is possible to bring the reproduction speed in the voice period close to the standard reproduction speed, without giving a hearer a sense of unease because of a long silent period. It is thus possible to perform handover from the first wireless communication network to the second wireless communication network, without deteriorating reproduction quality and real-time property.

BRIEF DESCRIPTION OF DRAWINGS

FIG. 4 is diagrams illustrating a calculation method of a handover preparation time by a handover control unit shown in FIG. 2;

Figure 1:
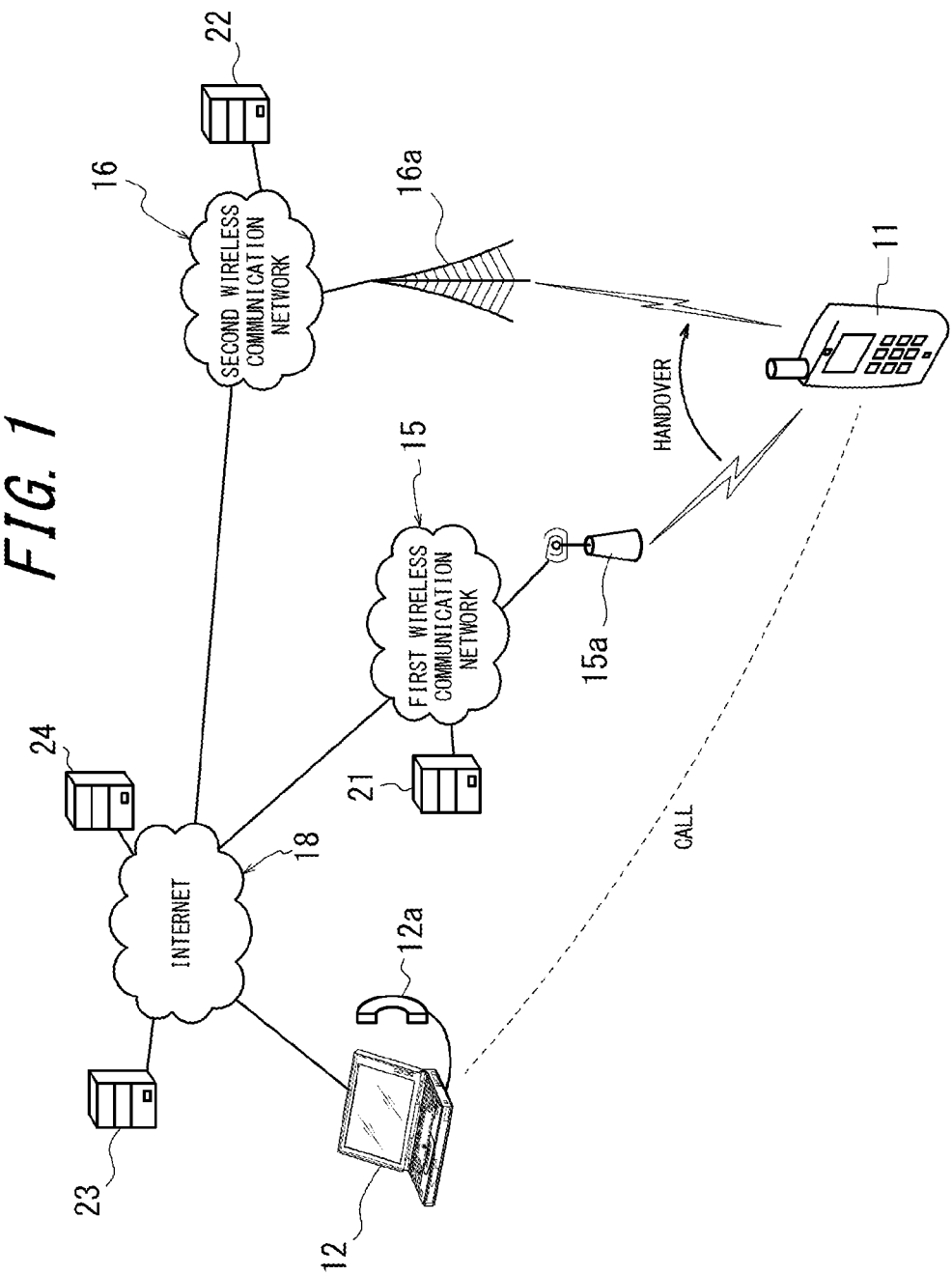
FIG. 1 is a diagram illustrating a schematic constitution of a communication network which a wireless communication apparatus according to an embodiment of the present invention can use.

REFERENCE SIGNS LIST 11 wireless communication apparatus
12 counterpart communication terminal
12a handset
15 first wireless communication network
15a access point
16 second wireless communication network
16a base station
18 internet
21, 22, 24 SIP server
23 Home Agent (HA)
31 first wireless I/F
32 second wireless I/F
33 telephone function unit
34 communication processing unit
35 radio information obtaining unit
36 handover control unit
47 jitter buffer
50 jitter buffer monitoring unit
51 jitter buffer control unit
55 handover information obtaining unit
56 reproduction speed calculation unit
61 measuring server
62 first information server
63 second information server

DESCRIPTION OF EMBODIMENT

Embodiments of the present invention will be described with reference to the accompanying drawings.

FIG. 1 is a diagram illustrating a schematic constitution of an example of a communication network which a wireless communication apparatus according to an embodiment of the present invention can use. FIG. 1 shows a case where a wireless communication apparatus 11, which is a mobile node, calls a counterpart communication terminal 12, which is a correspondent node, by use of VoIP, an application for real-time communication. The wireless communication apparatus 11 can perform handover between a first wireless communication network 15 and a second wireless communication network 16. The first wireless communication network 15 and the second wireless communication network 16 are connected to the internet 18.

Here, it is assumed that the first wireless communication network 15 is a wireless LAN (Local Area Network), for example, and the second wireless communication network 16 is a mobile phone network of cdma2000 1xEV-DO (Code Division Multiple Access 2000 1x Evolution Data Only), for example. It is also assumed that a delay time (downlink absolute delay time) of the first wireless communication network 15 is shorter than the delay time (downlink absolute delay time) of the second wireless communication network 16. In FIG. 1, a reference sign 15a represents an access point of the first wireless communication network 15, whereas a reference sign 16a represents a base station of the second wireless communication network 16.

The counterpart communication terminal 12 may be a personal computer, for example, having a handset 12a connected thereto and a softphone installed therein, and is connected to the internet 18 via an internet service provider (not shown).

The first wireless communication network 15 and the second wireless communication network 16 are connected to SIP (Session Initiation Protocol) servers 21 and 22 for controlling communication, respectively. In addition, a Home Agent (HA) 23 for transferring received packets addressed to the wireless communication apparatus 11 to a wireless communication network to which the wireless communication apparatus 11 is connected and a SIP server 24 for controlling communication are connected to the internet 18.

In the communication network shown in FIG. 1, a home address used in the wireless communication network to which the wireless communication apparatus 11 originally belongs is registered to the HA 23, and a care-of address of the wireless communication network 16 of a handover destination is also registered to the HA 23 at a time of handover. Thereby, the wireless communication apparatus 11 can perform handover between different wireless communication networks. Since such IP mobility techniques are known in the above Mobile IP and NEMO, detailed description thereof is omitted here.

In the present embodiment, it is assumed that the wireless communication network to which the wireless communication apparatus 11 originally belongs is the first wireless communication network 15, and handover is performed from the first wireless communication network 15 to the second wireless communication network 16.

Figure 2:
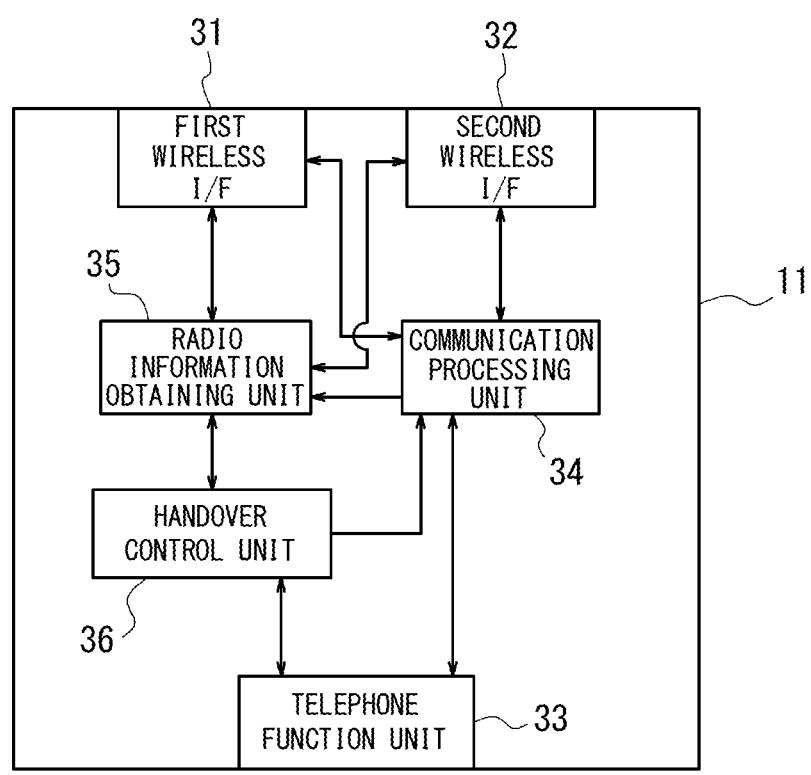
FIG. 2 is a block diagram illustrating a schematic constitution of the wireless communication apparatus shown in FIG. 1.

FIG. 2 is a functional block diagram illustrating a schematic constitution of the wireless communication apparatus according to the present embodiment shown in FIG. 1. The wireless communication apparatus 11 includes a first wireless I/F (interface) 31 corresponding to the first wireless communication network 15, a second wireless I/F 32 corresponding to the second wireless communication network 16, a telephone function unit 33 for executing an application of VoIP, a communication processing unit 34 for controlling connection to the first wireless communication network 15 and the second wireless communication network 16, a radio information obtaining unit 35 for obtaining radio information of the first wireless communication network 15 and the second wireless communication network 16, and a handover control unit 36 for controlling handover between the first wireless communication network 15 and the second wireless communication network 16.

The communication processing unit 34, together with the first wireless I/F 31 and the second wireless I/F 32, constitutes a wireless communication unit for executing wireless communication. The communication processing unit 34 controls connection of the first wireless I/F 31 or the second wireless I/F 32 such that the telephone function unit 33 and the counterpart communication terminal 12 communicate each other via the first wireless communication network 15 or the second wireless communication network 16 and communicate with the HA 23 under the control of the handover control unit 36.

The radio information obtaining unit 35 obtains communication quality of the first wireless communication network 15 and the second wireless communication network 16 as radio information from the first wireless I/F 31 and the second wireless I/F 32, correspondingly, and provides the communication quality obtained with the handover control unit 36. Here, RSSI (Received Signal Strength Indicator) indicating a radio state is obtained as the communication quality. The radio information obtaining unit 35 thus constitutes a communication quality obtaining unit for obtaining the communication quality of a wireless link.

The handover control unit 36 generates handover information including a determination whether to schedule handover, that is, whether to start handover preparation, based on the communication quality from the radio information obtaining unit 35, and then controls handover based on the handover information.

Figure 3:
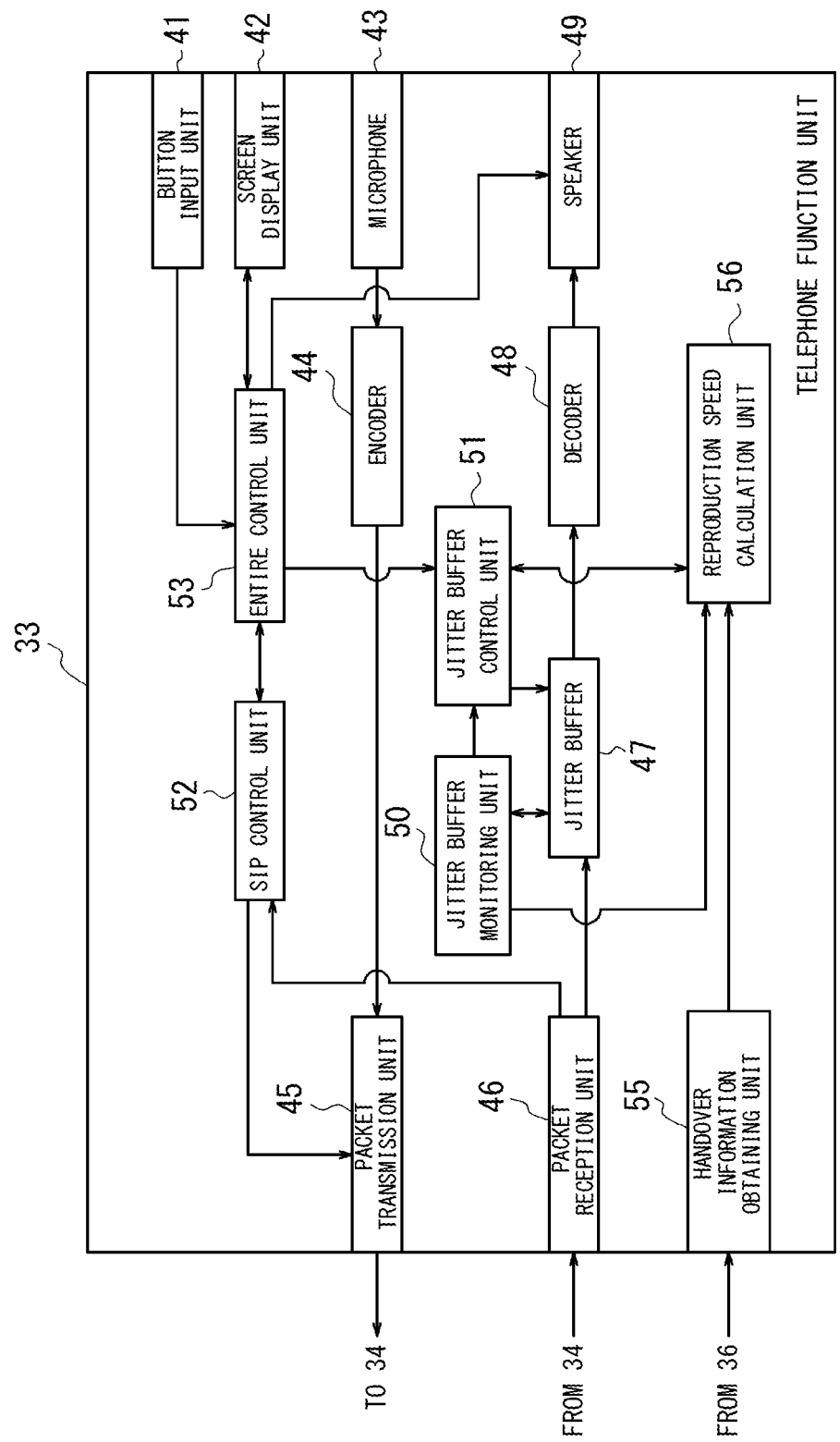
FIG. 3 is a functional block diagram illustrating a schematic constitution of a telephone function unit of the wireless communication apparatus shown in FIG. 2.

FIG. 3 is a functional block diagram illustrating a schematic constitution of the telephone function unit 33 of the wireless communication apparatus 11 shown in FIG. 2. The telephone function unit 33 may be a softphone, for example, and similarly to the constitution of a known softphone, includes a button input unit 41, a screen display unit 42, a microphone 43, an encoder 44, a packet transmission unit 45, a packet reception unit 46, a jitter buffer 47, a decoder 48, a speaker 49, a jitter buffer monitoring unit 50, a jitter buffer control unit 51, a SIP control unit 52, and an entire control unit 53 for controlling operations entirely.

The entire control unit 53 obtains operation information by a user via the button input unit 41 or the screen display unit 42 and controls entire operations based on the information obtained. The SIP control unit 52 controls SIP procedure to start or end the call. During the call, audio data obtained from the microphone 43 are encoded by the encoder 44 and the encoded data are inserted into packet by the packet transmission unit 45 and transmitted to the counterpart communication terminal 12 via the communication processing unit 34.

Packets from the counterpart communication terminal 12 received by the packet reception unit 46 via the communication processing unit 34 are once stored in the jitter buffer 47 and then read out. Payloads of the packets read out are decoded by the decoder 48 and output as reproduced voice from the speaker 49. A packet reception state of the jitter buffer 47 and the number of packets (data amount) in the jitter buffer 47 are monitored by the jitter buffer monitoring unit 50 and, based on a result of monitoring, the jitter buffer control unit 51 controls a read-out speed of the packets from the jitter buffer 47 and a process to discard the received packets and the likes.

In the wireless communication apparatus 11 according to the present embodiment, the telephone function unit 33 is further provided with a handover information obtaining unit 55 and a reproduction speed calculation unit 56. The handover information obtaining unit 55 monitors the handover information from the handover control unit 36 at predetermined intervals to obtain information on whether there is a handover schedule. If there is the handover schedule, the handover information obtaining unit 55 further obtains required handover information from the handover control unit 36 and provides the reproduction speed calculation unit 56 with the required handover information obtained.

The reproduction speed calculation unit 56, based on the required handover information obtained from the handover information obtaining unit 55, determines whether to control the read-out speed of packets in the jitter buffer 47, that is, a reproduction speed of received packets (reproduction speed of VoIP application in the present embodiment). In a case to control as a result, the reproduction speed calculation unit 56 calculates the reproduction speed of the received packets based on the required handover information obtained, a result of monitoring the jitter buffer 47 by the jitter buffer monitoring unit 50 and an elapsed time after the notification of the handover schedule, and the provides a result of calculation to the jitter buffer control unit 51.

The jitter buffer monitoring unit 50 of the wireless communication apparatus 11 according to the present embodiment monitors a type of packet (type of data) to be read out from the jitter buffer 47, that is, whether the data are voice packets (data of a first type) or non-voice packets (data of a second type) and notifies the jitter buffer control unit 51 of a result of the monitoring. Therefore, for performing VoIP communication, a voice codec which has a function to transmit packets different between for non-voice and for voice, such as Speex is used. In addition, if the type of packet to be read out from the jitter buffer 47 is the non-voice packet, the jitter buffer monitoring unit 50 counts the non-voice packet to measure a silent period (continuous period) in which the non-voice packets are continued and notifies the jitter buffer control unit 51 of information on the silent period measured.

If the type of packet notified by the jitter buffer monitoring unit 50 is the voice packet, the jitter buffer control unit 51 controls reproduction of received packets from the jitter buffer 47, such that the reproduction speed of the application becomes the reproduction speed calculated by the reproduction speed calculation unit 56. In contrast, if the type of packet notified by the jitter buffer monitoring unit 50 is the non-voice packet, the jitter buffer control unit 51 controls the reproduction speed of the application, without using the reproduction speed calculated by the reproduction speed calculation unit 56, by reproducing the non-voice packets at the standard reproduction speed of the application while extending the silent period according to the silent period notified by the jitter buffer monitoring unit 50. Control of the reproduction speed of the application by the jitter buffer control unit 51 is further described below.

Accordingly, the telephone function unit 33 of the wireless communication apparatus 11 according to the present embodiment constitutes an execution unit for executing an application for real-time communication and a control unit for controlling the reproduction speed of the application.

The following is a description of an operation of the wireless communication apparatus 11 according to the present embodiment. First, an operation of the handover control unit 36 is mainly described.

The handover control unit 36 determines the handover schedule based on the communication quality obtained from the first wireless I/F 31 and the second wireless I/F 32. For example, if the communication quality obtained from the first wireless I/F 31 becomes lower than a handover schedule determination threshold and the communication quality obtained from the second wireless I/F 32 becomes equal to or higher than the handover schedule determination threshold during the call by forming a wireless link with the first wireless communication network 15, the handover control unit 36 determines to perform handover to the second wireless communication network 16, that is, determines to start handover preparation. The communication quality of the second wireless communication network 16 not being used for the call is obtained (measured) by receiving notification information transmitted from the base station 16a, for example.

If determining the handover schedule, the handover control unit 36 obtains a handover preparation time Tb which is a time before starting handover, that is, a time before receiving a last packet of the handover source, a downlink absolute delay time Tddn1 of the handover source in a wireless communication network being used currently (here, the first wireless communication network 15) and a downlink absolute delay time Tddn2 of the handover destination in a wireless communication network of the handover destination (here, the second wireless communication network 16). Then, the handover control unit 36 provides the telephone function unit 33 with such obtained information as required handover information, together with information that there is a handover schedule. Accordingly, the handover control unit 36 of the wireless communication apparatus 11 according to the present embodiment constitutes a determination unit for determining whether to start handover preparation, an estimation unit for estimating the handover preparation time, and a measuring unit for measuring the delay time of each of the first wireless communication network 15 and the second wireless communication network 16.

Next, methods to obtain the handover preparation time Tb, the downlink absolute delay time Tddn1 of the handover source and the downlink absolute delay time Tddn2 of the handover destination by the handover control unit 36 are described.

(Method to Obtain Handover Preparation Time Tb)

The handover preparation time Tb, as shown in FIG. 4(a) and (b) for example, is calculated based on a change rate ΔRs (slope) of a radio state (Rs) in a unit time which determines the communication quality. Here, although the change rate ΔRs can be obtained by being measured at a point when handover schedule is determined as the radio state becomes lower than the handover schedule determination threshold, an average change rate ΔRsrms is obtained over a period from a predetermined time before the handover schedule is determined to the time when the handover schedule is determined during the call in the present embodiment.

Consequently, the handover control unit 36 calculates the change rate ΔRs(t) in the unit time (Δt) of the radio state of the wireless communication network currently being used, by a formula 1 shown below at a predetermined timing, and stores a plurality of change rates ΔRs(t) to a predetermined time before (for example, 2 seconds before) in a memory. Then, when the handover schedule is determined, the handover control unit 36 calculates the average change rate ΔRsrms over a period to the predetermined time before, form change rates stored at the timing. Here, it is assumed that the radio state is gradually deteriorated.

[Formula 1]

$$\Delta Rs(t) = |\{Rs(t) - Rs(t - \Delta t)\}/\Delta t| \quad (1)$$

Subsequently, the handover control unit 36 determines whether the average change rate ΔRsrms calculated is smaller than a change rate threshold Rsref determined in advance. As a result, if ΔRsrms≦Rsref is satisfied, that is, if the radio state changes gently, the handover preparation time Tb is set to a standard time Tref (5 seconds, for example) determined in advance, as shown in FIG. 4(a).

In contrast, if ΔRsrms>Rsref is satisfied, that is, if the radio state changes rapidly, Tb=Tref (Rsref/ΔRsrms) is calculated, for example, and the handover preparation time Tb is set to be shorter than the reference time Tref, as the average change rate ΔRsrms is greater. FIG. 4(b) shows a case where ΔRsrms>Rsref is satisfied and the handover preparation time Tb is set to be approximately half of the reference time Tref (2.5 seconds).

(Method to Obtain Absolute Delay Times Tddn1, Tddn2)

The downlink absolute delay time Tddn1 of the handover source and the downlink absolute delay time Tddn2 of the handover destination are obtained by one of first to fourth methods to obtain the absolute delay time described below. It is to be noted that, since a network between the counterpart communication terminal (CN: Correspondent Node) 12 and the HA 23 is not changed, the absolute delay time therebetween is not considered in the description below.

(a) First Method to Obtain Absolute Delay Time

After determining the handover schedule, the handover control unit 36 controls the telephone function unit 33 and/or the communication processing unit 34 to request the HA 23, which is temporally synchronized with the wireless communication apparatus 11, to transmit measuring packets having transmission time stamps. Thereby, the HA 23 transmits the measuring packets to both of the first wireless communication network 15 and the second wireless communication network 16. The wireless communication apparatus 11 receives the measuring packets transmitted from the HA 23 via the first wireless I/F 31 and the second wireless I/F 32 correspondingly and measures the downlink absolute delay times Tddn1 and Tddn2 of corresponding networks based on reception times of the measuring packets and time stamps thereof. If the downlink absolute delay time of the wireless communication network of the handover source can be measured from the packets received during a call, transmission of the measuring packet to the wireless communication network of the handover source can be omitted.

(b) Second Method to Obtain Absolute Delay Time

After determining the handover schedule, the handover control unit 36 controls the telephone function unit 33 and/or the communication processing unit 34 to accordingly notify the HA 23, which is temporally synchronized with the wireless communication apparatus 11. Thereby, in the same manner as the first method to obtain the absolute delay time described above, the HA 23 transmits the measuring packets to both of the first wireless communication network 15 and the second wireless communication network 16 so that the handover control unit 36 measures the downlink absolute delay times Tddn1, Tddn2 of the corresponding networks.

(c) Third Method to Obtain Absolute Delay Time

After determining the handover schedule, the handover control unit 36 controls the telephone function unit 33 and/or the communication processing unit 34 such that the wireless communication apparatus 11 transmits measuring packets such as PING and RTCP to the HA 23, which is temporally synchronized with the wireless communication apparatus 11, through both of the first wireless communication network 15 and the second wireless communication network 16, and then by receiving replies, measures the downlink absolute delay times Tddn1, Tddn2 of the corresponding networks.

(d) Fourth Method to Obtain Absolute Delay Time

After determining the handover schedule, the handover control unit 36 obtains the absolute delay time of each wireless communication network by using a handover scheme considered for IEEE 802.21.

Figure 5:
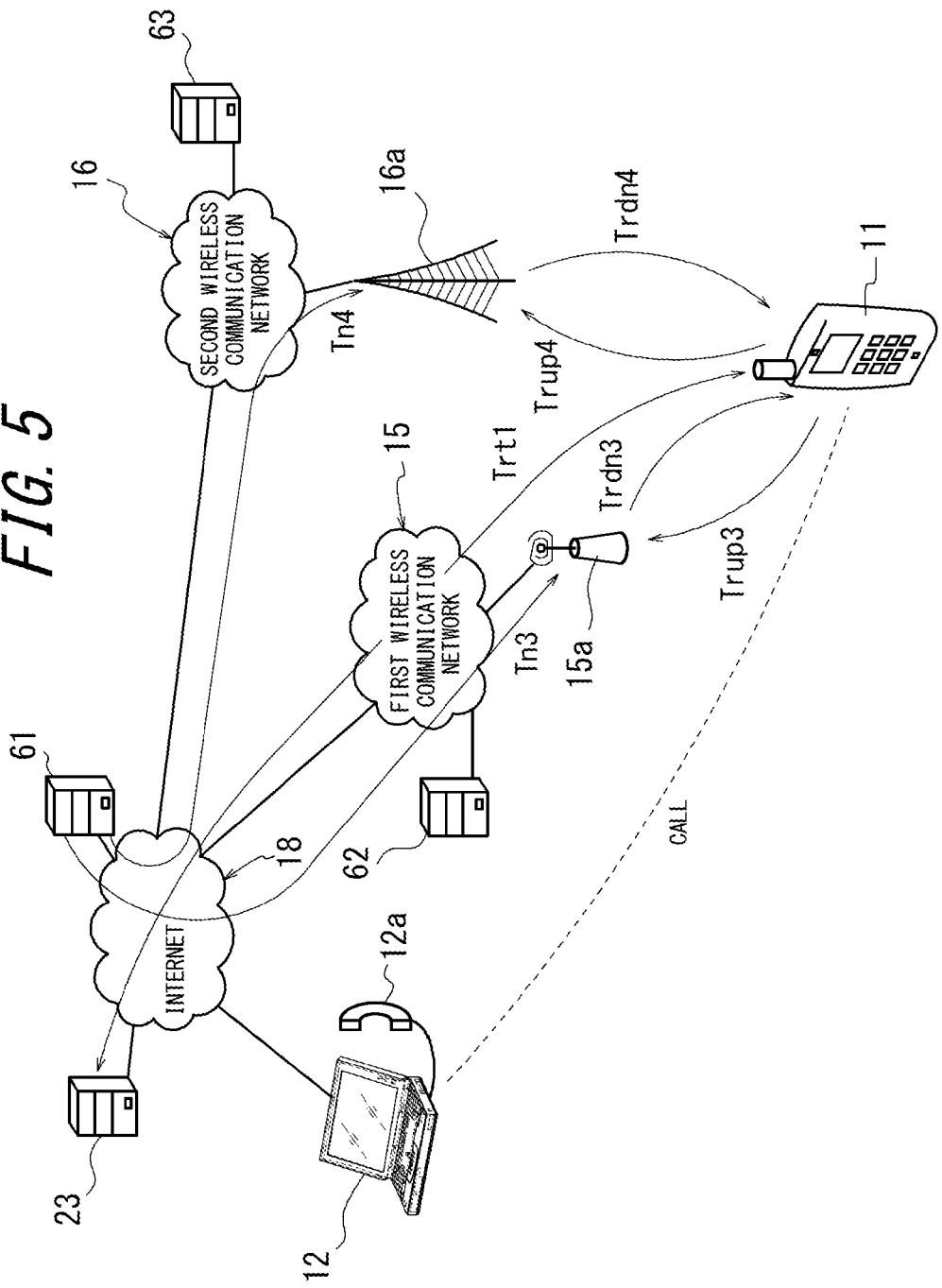
FIG. 5 is a diagram illustrating an exemplary method to obtain an absolute delay time.

FIG. 5 is a diagram illustrating the fourth method to obtain the absolute delay time. In FIG. 5, a measuring server 61 for operating to measure the absolute delay time is connected to the internet 18, which is a backbone network. A first information server 62 and a second information server 63 are connected to the first wireless communication network 15 and the second wireless communication network 16, respectively.

First, the method to obtain the absolute delay time (Tddn1) of the first wireless communication network 15 of the handover source is described. The wireless communication apparatus 11 obtains values of (i) and (ii) described below from the first information server 62 of the first wireless communication network 15.

(i) A reference value (Tn3) of a one-way delay time from the measuring server 61 to the access point 15a currently connected on the first wireless communication network 15.

(ii) Reference values of the downlink and uplink delay times between the access point 15a and the terminal connecting thereto (downlink: Trdn3, uplink: Trup3)

In addition, the wireless communication apparatus 11 transmits the measuring packet such as PING to the HA 23, and then by receiving the reply, measures a round-trip delay time Trt1 between the wireless communication apparatus 11 and the HA 23. Then, the wireless communication apparatus 11 calculates the absolute delay time Tddn1 of the first wireless communication network 15 from the values based on Formula 2 shown below. However, since the one-way delay time between the access point 15a and the HA 23 cannot be obtained, the one-way delay time is defined as an approximate value of a sum of Tn3 and $\{Trt1-(Tn3+Trdn3+Tn3+Trup3)\}/2$.

[Formula 2]

$$Tddn1 = Tn3 + Trdn3 + \{Trt1-(Tn3+Trdn3+Tn3+Trup3)\}/2 \quad (2)$$

Next, a method to obtain the absolute delay time (Tddn2) of the second wireless communication network 16 of the handover destination is described. The wireless communication apparatus 11 obtains values of (iii) and (iv) described below from the second information server 63 connected to the second wireless communication network 16 of the handover destination via the first information server 62 of the first wireless communication network 15. Location information of the wireless communication apparatus 11 obtained by the wireless communication apparatus 11 or the access point 15a is transmitted to the second information server 63.

(iii) A reference value (Tn4) of the one-way delay time between the base station 16a, to which the wireless communication apparatus 11 is expected to connect, and the measuring server 61.

(iv) Reference values of downlink and uplink delay times between the base station 16a and the terminal connecting thereto (downlink: Trdn4, uplink: Trup4)

Then, the absolute delay time Tddn2 of the second wireless communication network 16 is calculated from the values using Formula 3 shown below. However, since the one-way delay time between the base station 16a and the HA 23 cannot be obtained, the one-way delay time is defined as an approximate value of a sum of Tn4 and $\{Trt1-(Tn3+Trdn3+Tn3+Trup3)\}/2$.

[Formula 3]

$$Tddn2 = Tn4 + Trdn4 + \{Trt1-(Tn3+Trdn3+Tn3+Trup3)\}/2 \quad (3)$$

As described above, the handover control unit 36 obtains the handover preparation time Tb, the downlink absolute delay time Tddn1 of the handover source and the downlink absolute delay time Tddn2 of the handover destination and provides such obtained information to the telephone function unit 33.

In addition, if determining the handover schedule, the handover control unit 36 controls the communication processing unit 34 to connect the second wireless I/F 32 to the second wireless communication network 16. Then, when the handover preparation time T1 has passed, the handover control unit 36 transmits Registration Request (Binding Update in NEMO) to the HA 23 via the second wireless communication network 16 of the handover destination and registers a care-of address of the handover destination to the HA 23.

At that time, the handover control unit 36 sets eight bits of Registration Request Field of the Registration Request message (using Multiple care of address in NEMO) into the communication processing unit 34, so as to be able to communicate with either the first wireless communication network 15 or the second wireless communication network 16.

Subsequently, when receiving the Registration Reply (Binding Acknowledge in NEMO), which is handover completion information, from the HA 23, the handover control unit 36 deregisters the care-off address of the first wireless communication network 15 of the handover source and disconnects. Thereafter, the handover control unit 36 controls the communication processing unit 34 so as to maintain the VoIP application via the second wireless communication network 16 of the handover destination and provides the telephone function unit 33 with the handover completion information received.

Figure 6:
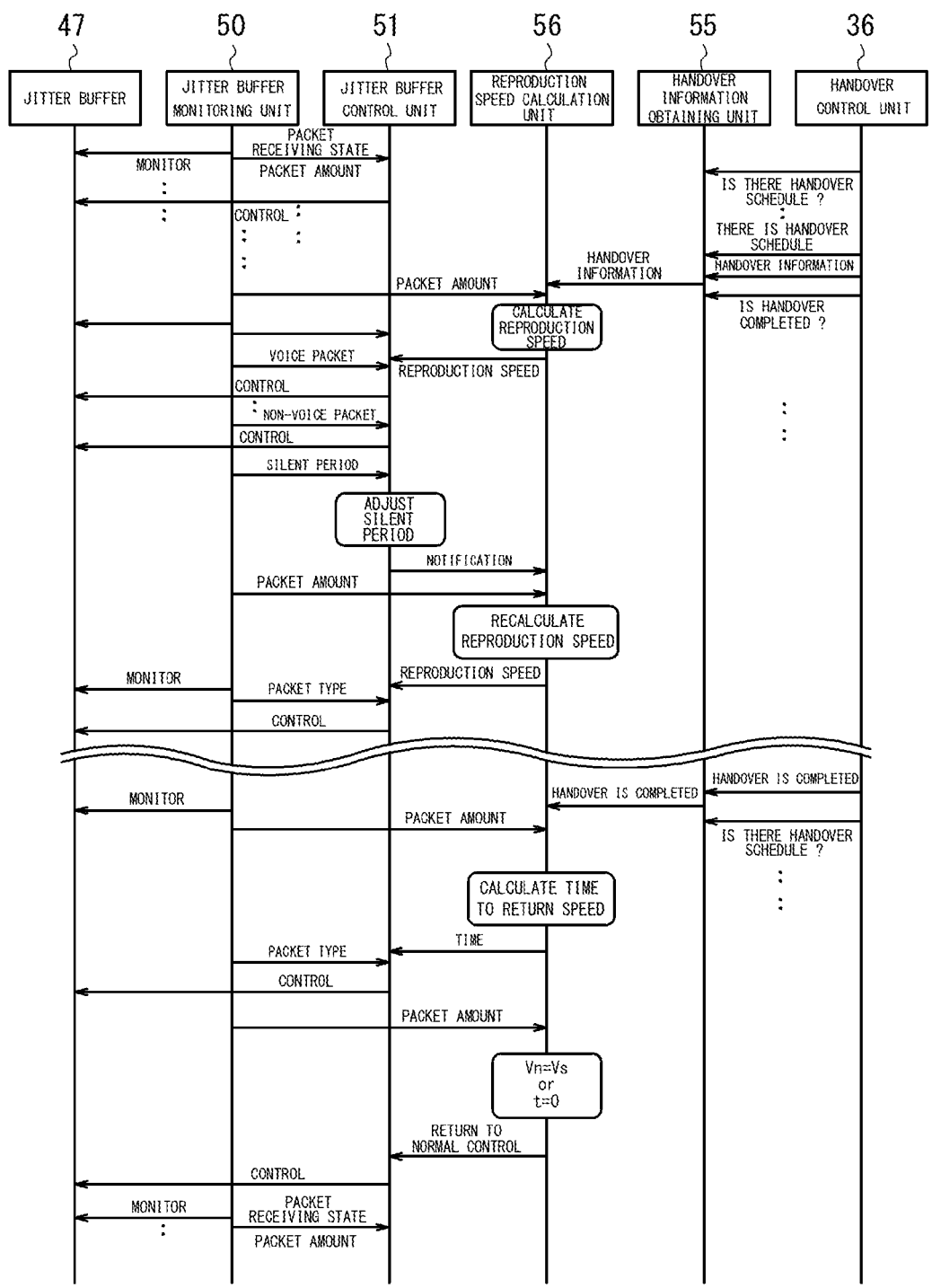
FIG. 6 is a sequence diagram illustrating an operation of a main section of the telephone function unit shown in FIG. 3.

Next, an operation of the telephone function unit 33 is described. FIG. 6 is a sequence diagram illustrating an operation of a main section of the telephone function unit 33. The handover information obtaining unit 55 monitors handover information from the handover control unit 36 at certain intervals. If information that there is the handover schedule is obtained as a result, the handover information obtaining unit 55 further obtains the handover preparation time Tb, the downlink absolute delay time Tddn1 of the handover source and the downlink absolute delay time Tddn2 of the handover destination, as the required handover information from the handover control unit 36, and provides the reproduction speed calculation unit 56 with the required handover information.

The reproduction speed calculation unit 56 stores the required handover information obtained from the handover information obtaining unit 55 and, based on the handover information obtained, calculates a difference Ta (Ta=Tddn2−Tddn1) between the downlink absolute delay time (Tddn2) of the second wireless communication network 16 and the downlink absolute delay time (Tddn1) of the first wireless communication network 15, and determines whether the difference Ta exceeds a predetermined value (>0).

If the delay time difference Ta exceeds the predetermined value as a result, the reproduction speed calculation unit 56 calculates the reproduction speed Vs for voice packets in the jitter buffer 47 using Formula 4 shown below based on the required handover information obtained and the result of monitoring the jitter buffer 47 by the jitter buffer monitoring unit 50, such that the number of packets in the jitter buffer 47 becomes zero at a time to start receiving the packets from the second wireless communication network 16 of the handover destination, for example. Then, the reproduction speed calculation unit 56 provides a result to the jitter buffer control unit 51. In Formula 4, Vn indicates the standard reproduction speed, while Tc indicates a time corresponding to the number of packets (data amount) being currently in the jitter buffer 47, which shows, in this case, a time corresponding to the number of packets in the jitter buffer 47 at a time to receive the information that there is the handover schedule. In addition, the reproduction speeds Vs, Vn are expressed by a time ratio (time/time) and V=1, for example. Moreover, Tp indicates an elapsed time after reception of the information that there is the handover schedule, and Tp=0, initially.

[Formula 4]

If $Tb \geq Tp$, $$Vs = \{Tc + (Tb - Tp) \times Vn\}/(Tb + Ta - Tp)$$

If $Tb < Tp$, $$Vs = Tc/(Tb + Ta - Tp) \quad (4)$$

If the type of packet monitored by the jitter buffer monitoring unit 50 is the voice packet, the jitter buffer control unit 51 controls reading out of the voice packets from the jitter buffer 47 so as to reproduce at the reproduction speed Vs calculated by the above Formula 4, which is slower than the standard reproduction speed.

Here, control of the reproduction speed of the voice packets by the jitter buffer control unit 51 is performed by either one of a first reproduction speed control method and a second reproduction speed control method described below, for example.

(a) First Reproduction Speed Control Method

It is assumed that TR=TR1/k, where TR1 is read-out interval of packets from the jitter buffer 47 corresponding to the standard reproduction speed Vn, k is (Tc+Tb×Vn)/(Tb+Ta−Tp) in Formula 4 shown above, and TR is read-out intervals of voice packets from the jitter buffer 47 corresponding to the reproduction speed Vs calculated. For example, in order to render the reproduction speed Vs to be 80% of the standard reproduction speed Vn (k=0.8) for the VoIP application which reads out and reproduces the packets in the jitter buffer 47 at intervals of 20 msec at the standard reproduction speed Vn, the read-out interval TR of the voice packets from the jitter buffer 47 is defined as TR=20/0.8 (msec).

(b) Second Reproduction Speed Control Method

When the control of the reproduction speed for handover is started, a combination of a time stamp of a voice packet (first voice packet) reproduced immediately thereafter and a reproduction time thereof is recorded. Voice packets thereafter are read out and reproduced from the jitter buffer 47 at a time Tv expressed by Formula 5 shown below. In Formula 5, TD indicates the delay time and an initial value thereof is zero.

[Formula 5]

$$Tv = (\text{time stamp of voice packet} - \text{time stamp of first voice packet}) + (\text{reproduction time of first voice packet} + TD) \quad (5)$$

Figure 7:
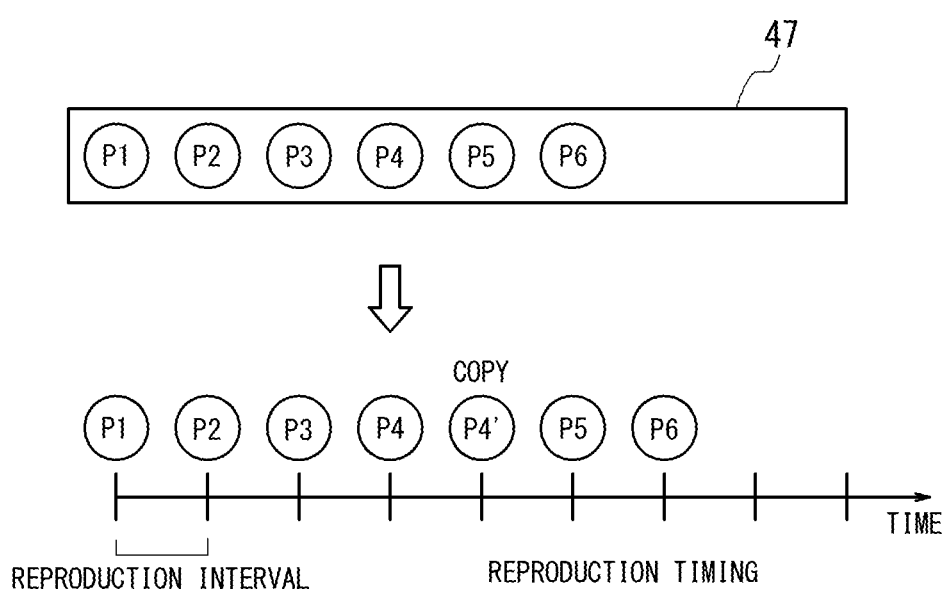
FIG. 7 is a diagram illustrating an exemplary control method of a reproduction speed of a voice packet by a jitter buffer control unit shown in FIG. 3.

Here, when the voice packets are read out from the jitter buffer 47, a voice packet read out at [{Vn/(Vn−Vs)}−1]th is copied and stored in a memory of the decoder 48. After reproduction of the original voice packet, the copied voice packet is read out and reproduced at next reproduction timing. For example, when the reproduction speed Vs is set to be 80% of the standard reproduction speed Vn, four sequential voice packets P1 to P4 in the jitter buffer 47 are read out and reproduced sequentially and the fourth voice packet P4 is copied, and a copied voice packet P4' is reproduced at a next reproduction timing after reproduction of the original voice packet P4, as shown in FIG. 7. Then, when a voice packet P5 is read out from the jitter buffer 47, TD in the above Formula 5 is increased as long as the time of reproduction interval by copying. It is to be noted that, if the voice packet to be read out at [{Vn/(Vn−Vs)}−1]th is not in the jitter buffer 47 because of not being received yet or being discarded, the same processing is performed on a voice packet of a next reproduction timing.

In contrast, if the type of packet monitored by the jitter buffer monitoring unit 50 is the non-voice packet, the jitter buffer control unit 51, regardless of the reproduction speed Vs calculated by the reproduction speed calculation unit 56, reproduces notified non-voice packets at the standard reproduction speed Vn. Subsequently, the jitter buffer control unit 51 reproduces the non-voice packets while extending a silent period according to the silent period notified from the jitter buffer monitoring unit 50. Therefore, the jitter buffer control unit 51 stores a reproduction speed rate in advance in accordance with the silent periods.

If the silent period is shorter than 500 ms, it does not generally make a hearer realize a significant difference even if the silent period is further extended. If the silent period is longer than 500 ms, however, it gives the hearer a sense of unease if the silent period is further extended. Therefore, if the silent period measured is long, the wireless communication apparatus 11 according to the present embodiment sets the speed rate so as to prevent further extension of the period regardless of the speed rate of the voice period (reproduction speed Vs calculated by Formula 4) and, if the silent period measured is relatively short such as intake of breath, sets the speed rate low.

Figure 8:
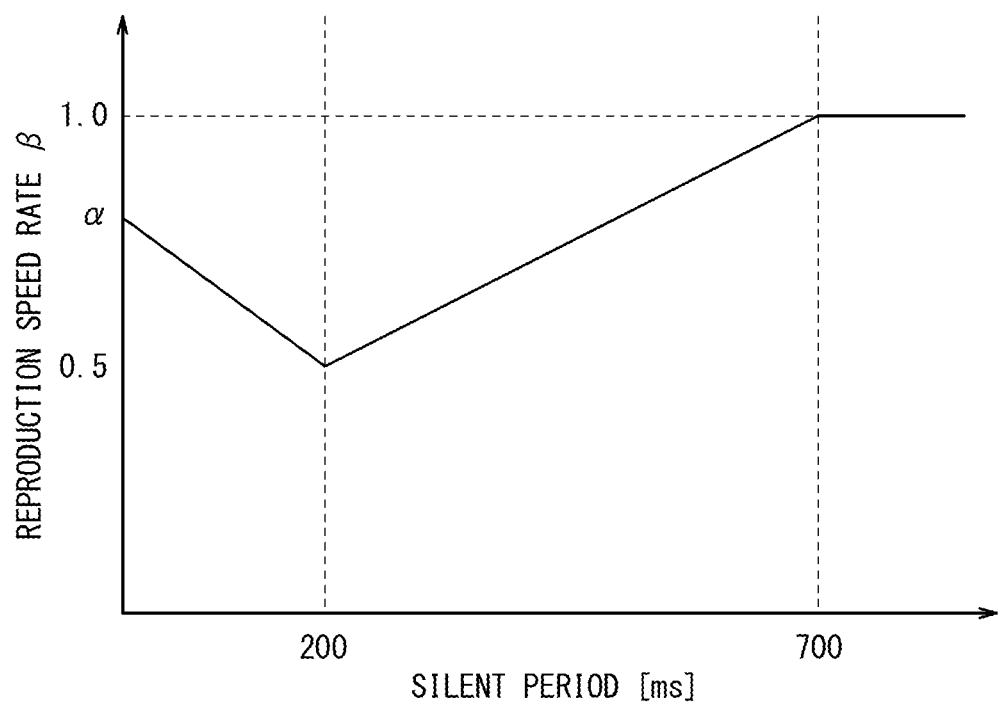
FIG. 8 is a diagram illustrating an example of a reproduction speed rate β☐ in accordance with a silent period stored in the jitter buffer control unit shown in FIG. 3.

FIG. 8 is a diagram illustrating an example of the reproduction speed rate β in accordance with the silent period stored in the jitter buffer control unit 51. For the wireless communication apparatus 11 according to the present embodiment, the reproduction speed rate β is 0.5, which is minimum, when the silent period is 200 ms and the reproduction speed rate β is 1, namely, the standard reproduction speed Vn when the silent period is 700 ms or more. The reproduction speed rate β is set to decrease continuously from the speed rate α (α=Vs) of the voice period reproduced at the reproduction speed Vs to the silent period of 200 ms (β=0.5)

and to increase continuously from the silent period of 200 ms to the silent period of 700 ms (β=1).

Figure 9:
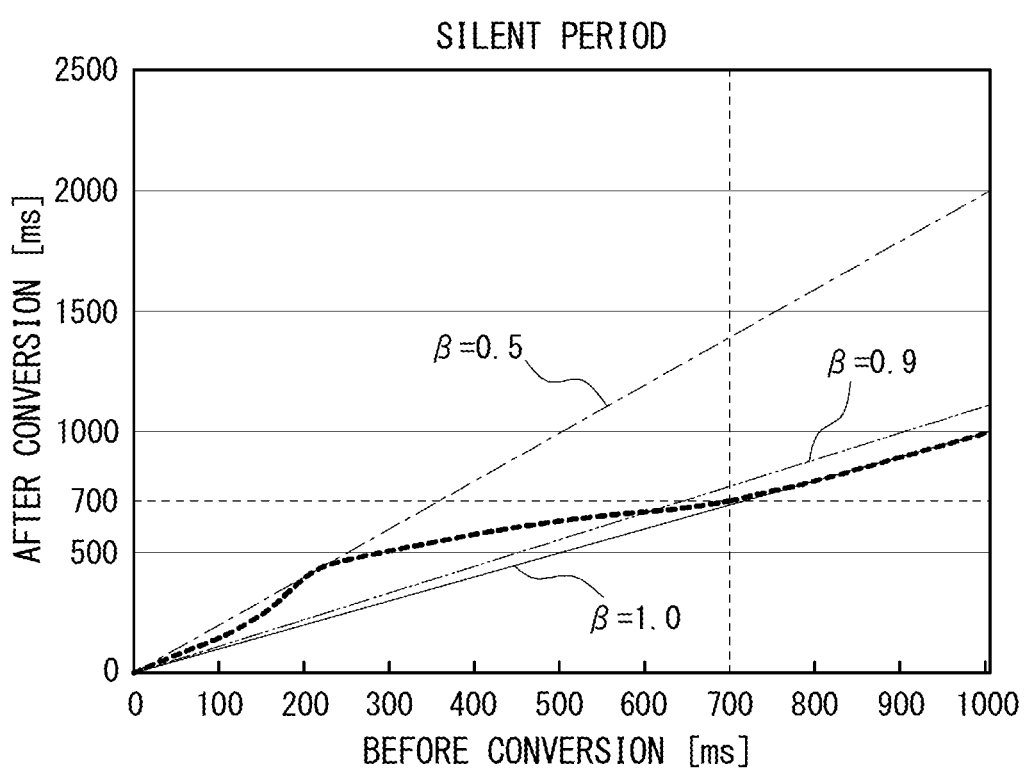
FIG. 9 is a diagram illustrating conversion properties of the silent period in accordance with the reproduction speed rate β shown in FIG. 8.

FIG. 9 is a diagram illustrating conversion properties of the silent period in accordance with the reproduction speed rate β shown in FIG. 8. In FIG. 9, a chain line, a chain double-dotted line and a solid line indicate conversion properties when β=0.5, β=0.9 and β=1.0, which means the standard reproduction speed Vn, respectively. As shown by a broken line in FIG. 9, the wireless communication apparatus 11 according to the present embodiment shifts (extends) the silent period after conversion in a direction closer to the conversion property by β=0.5 when the silent period before conversion is up to 200 ms, shifts the silent period after conversion in a direction closer to β=1, which means non-conversion, as closer to 700 ms when the silent period before conversion is from 200 ms to 700 ms, and does not extend the silent period similarly to the case of β=1, which means non-conversion, when the silent period before conversion is 700 ms or over.

If the type of packet monitored by the jitter buffer monitoring unit 50 is the non-voice packet, the jitter buffer control unit 51 reproduces the non-voice packet at the standard reproduction speed Vn while copying the non-voice packet already reproduced to a non-voice buffer (not shown). Then, when the jitter buffer control unit 51 detects a change to a voice packet based on a result of determination of the type of packet by the jitter buffer monitoring unit 50, the jitter buffer control unit 51 stops reproduction of packets from the jitter buffer 47 and reproduces a copied non-voice packet at the standard reproduction speed Vn by extending the silent period for a period of Tcp calculated by Formula 6 shown below. In Formula 6, Ts1 indicates the silent period notified by the jitter buffer monitoring unit 50, and β indicates the reproduction speed rate described above, corresponding to the silent period Ts1.

[Formula 6]

$$Tcp=(1/\beta-1)\times Ts1 \tag{6}$$

Accordingly, since the non-voice packet in the silent period Ts1 is reproduced in a period (Ts1+Tcp) according to the period Ts1, the non-voice packet is reproduced at a reproduction speed βVn according to the silent period Ts1

After the extended period Tcp has passed, the jitter buffer control unit 51 notifies the reproduction speed calculation unit 56 accordingly and discards the packets in the non-voice buffer. When receiving such notification that the extended period Tcp has passed from the jitter buffer control unit 51, the reproduction speed calculation unit 56 recalculates the reproduction speed Vs based on Formula 4 shown above, by using the delay time difference Ta, the standard reproduction speed Vn, and the time Tc corresponding to the number of packets currently in the jitter buffer 47, and provides a result to the jitter buffer control unit 51. Thereby, the jitter buffer control unit 51 returns to reproduction of packets from the jitter buffer 47 so as to reproduce voice packets at the reproduction speed Vs recalculated.

Thereafter, in the same manner as stated above, the voice packets are reproduced at the reproduction speed Vs calculated by the reproduction speed calculation unit 56 and the non-voice packets are reproduced at the reproduction speed according to the silent period. If the jitter buffer control unit 51 receives notification of the non-voice packet from the jitter buffer monitoring unit 50 when inputting the reproduction speed Vs first calculated by the reproduction speed calculation unit 56, the jitter buffer control unit 51 completes reproduction of the non-voice packets at the reproduction speed according to the silent period and then controls the reproduction speed calculation unit 56 to recalculate the reproduction speed Vs so as to shift to the reproduction of the voice packets.

As set forth above, the jitter buffer control unit 51 controls the reproduction speed of the received packets. Then, when the handover information obtain unit 55 obtains the handover completion information from the handover control unit 36, the reproduction speed calculation unit 56 obtains the number of packets (time) Tc currently in the jitter buffer 47 from the jitter buffer monitoring unit 50, calculates the reproduction time t at the reproduction speed Vs by using Formula 7 shown below, and then provides the jitter buffer control unit 51 with the time t(s).

[Formula 7]

$$t=(Tn-Tc)/(Vn-Vs) \tag{7}$$

Based on the result of monitoring the type of packet by the jitter buffer monitoring unit 50, the jitter buffer control unit 51 reproduces the packets at the reproduction speed Vs calculated by the reproduction speed calculation unit 56 until the reproduction speed Vs calculated by the reproduction speed calculation unit 56 as described above becomes equal to the standard reproduction speed Vn or until the time t calculated by Formula 7 has passed. Thereafter, the jitter buffer control unit 51 controls the jitter buffer 47 so as to reproduce the packets at the standard reproduction speed Vn.

Figure 10:
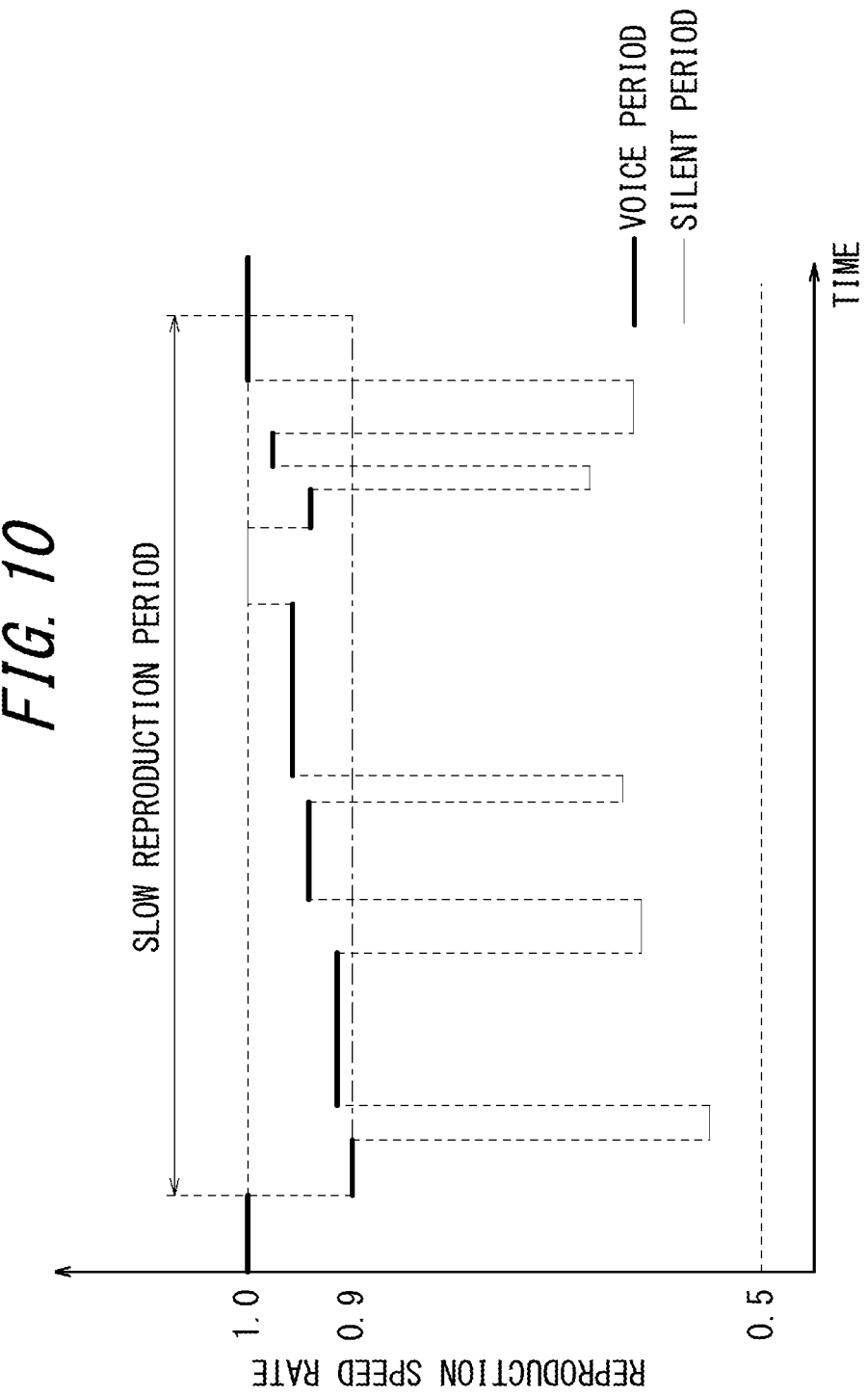
FIG. 10 is a diagram illustrating changes of the reproduction speed at handover by the jitter buffer control unit shown in FIG. 3.

FIG. 10 is a diagram illustrating changes of the reproduction speed at handover by the wireless communication apparatus 11 according to the present embodiment. In FIG. 10, a bold line represents the voice period, while a narrow line represents the silent period. A vertical axis represents the reproduction speed rate, while a horizontal axis represents time. The reproduction speed rate 1.0 is the standard reproduction speed. For a purpose of comparison, FIG. 10 also shows a slow reproduction period required until the number of packets in the jitter buffer 47 reaches a predetermined amount after completion of handover if the packets are reproduced at a constant speed of 0.9× after determination of the handover schedule.

As shown in FIG. 10, according to the wireless communication apparatus 11 of the present embodiment, the speed rate of the voice packets returns to the standard reproduction speed 1.0 as time passes, in comparison with a case where the voice packets are reproduced at the constant speed of 0.9× after determination of the handover schedule. Thereby, it is possible to reduce the sense of unease for the hearer because of reproduction at a low speed.

Figure 11:
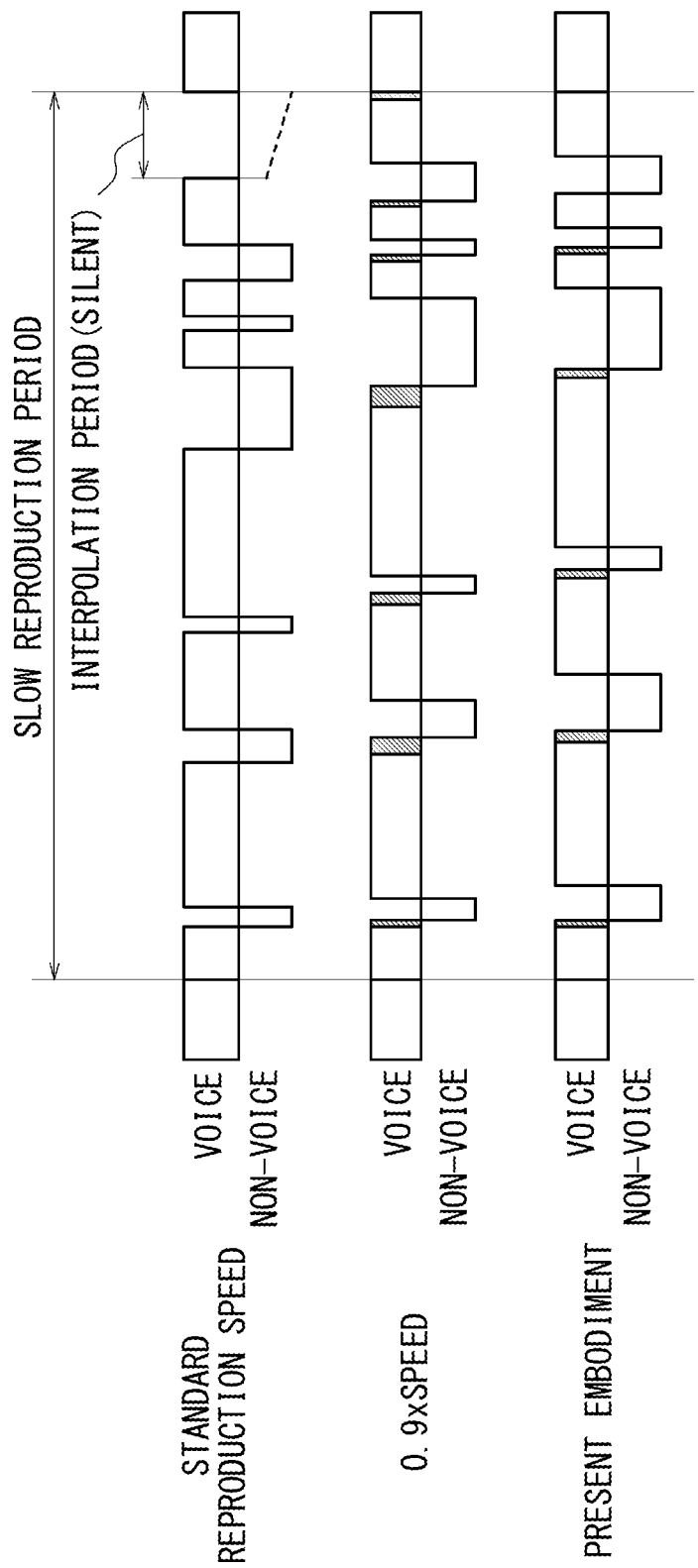
FIG. 11 is a diagram illustrating stretching states of voice when the jitter buffer control unit shown in FIG. 3 controls the reproduction speed at a standard reproduction speed (original voice) and at a constant speed of 0.9×.
Figure 12:
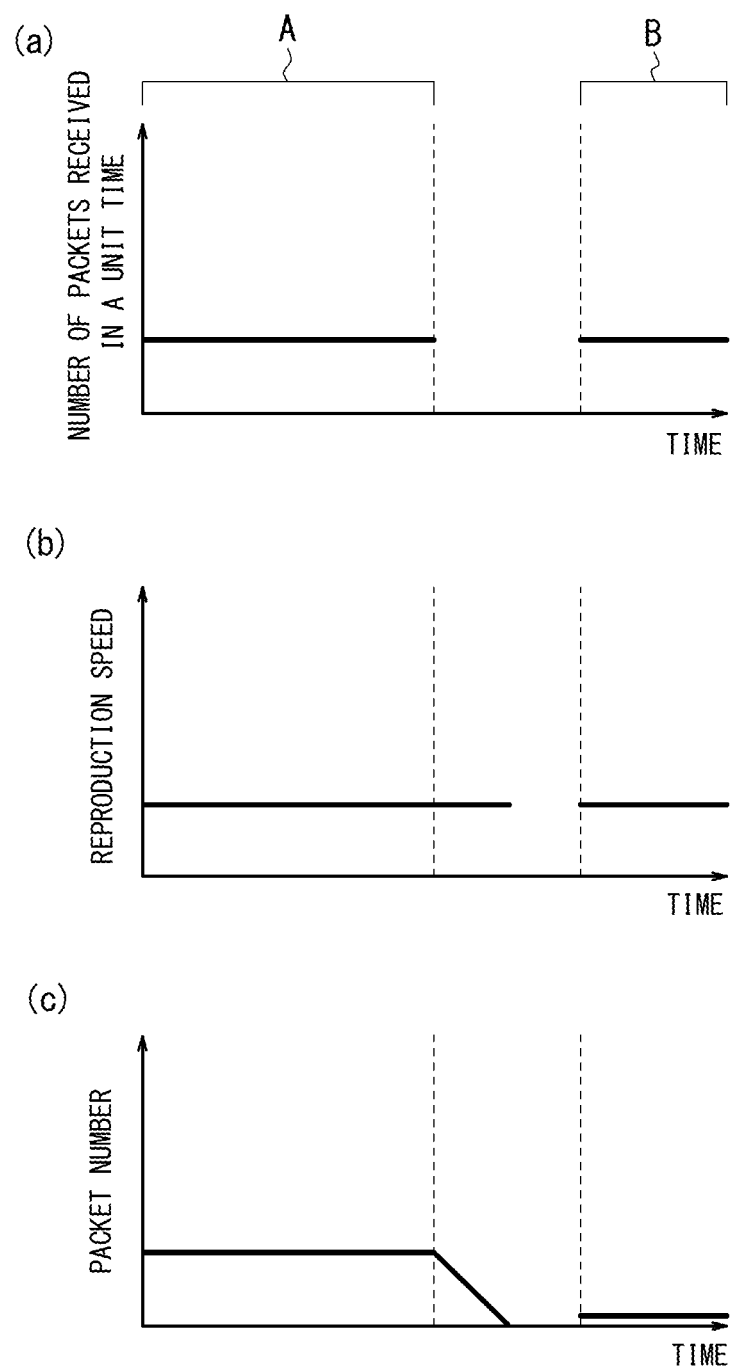
FIG. 12 is diagrams illustrating an example of a conventional control method of the jitter buffer.
Figure 13:
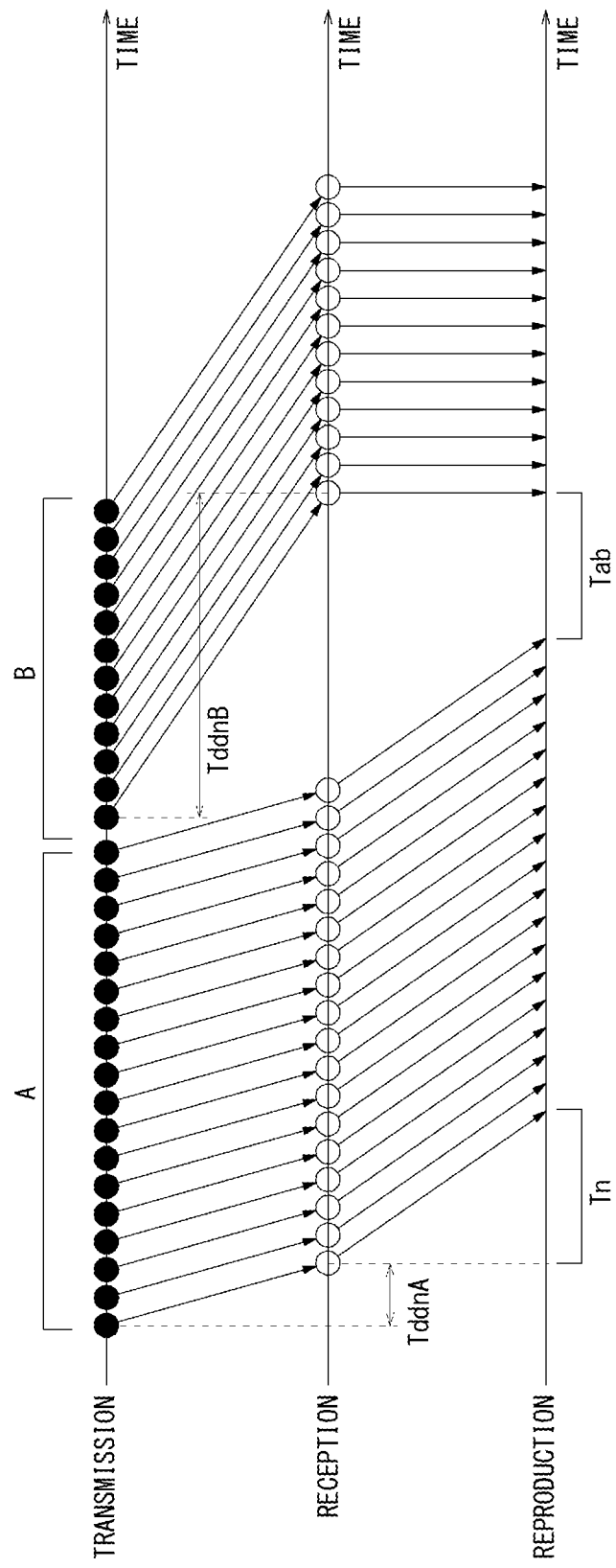
FIG. 13 is a diagram illustrating flows of the packets by the control method shown in FIG. 12.
Figure 14:
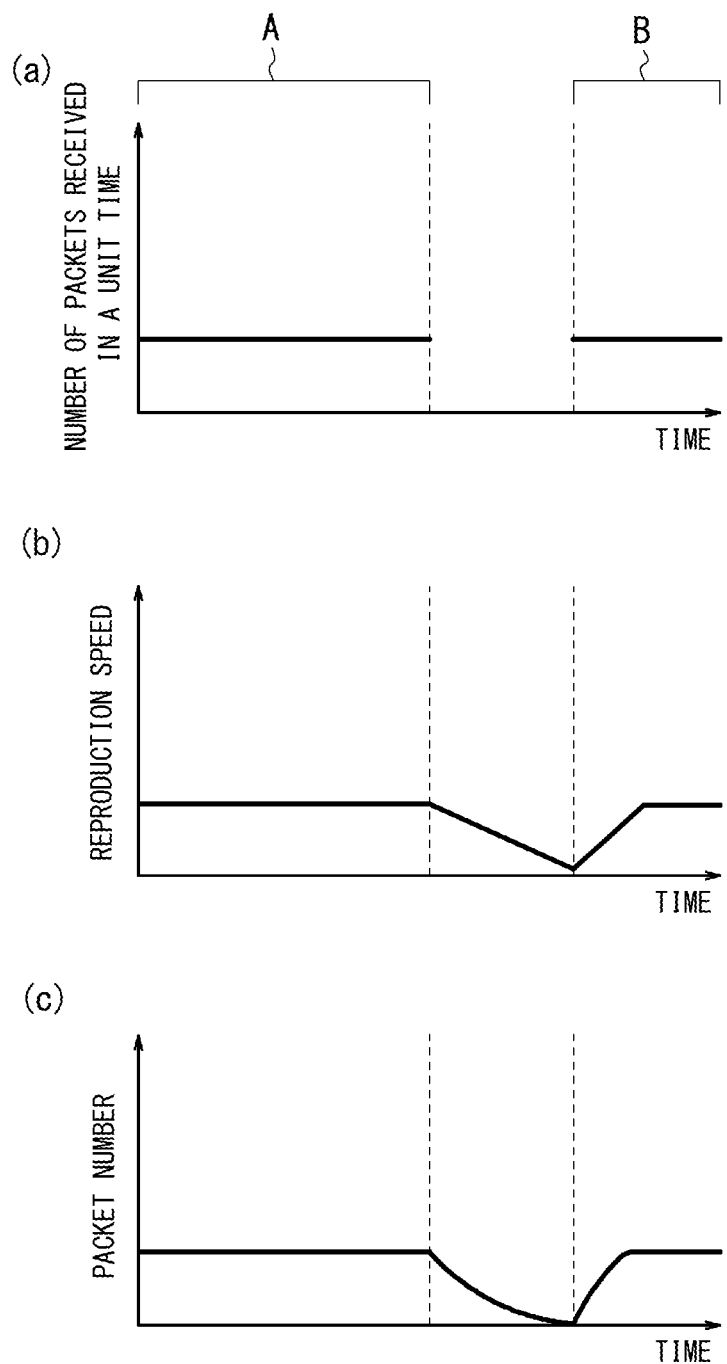
FIG. 14 is diagrams illustrating another example of the conventional control method of the jitter buffer.
Figure 15:
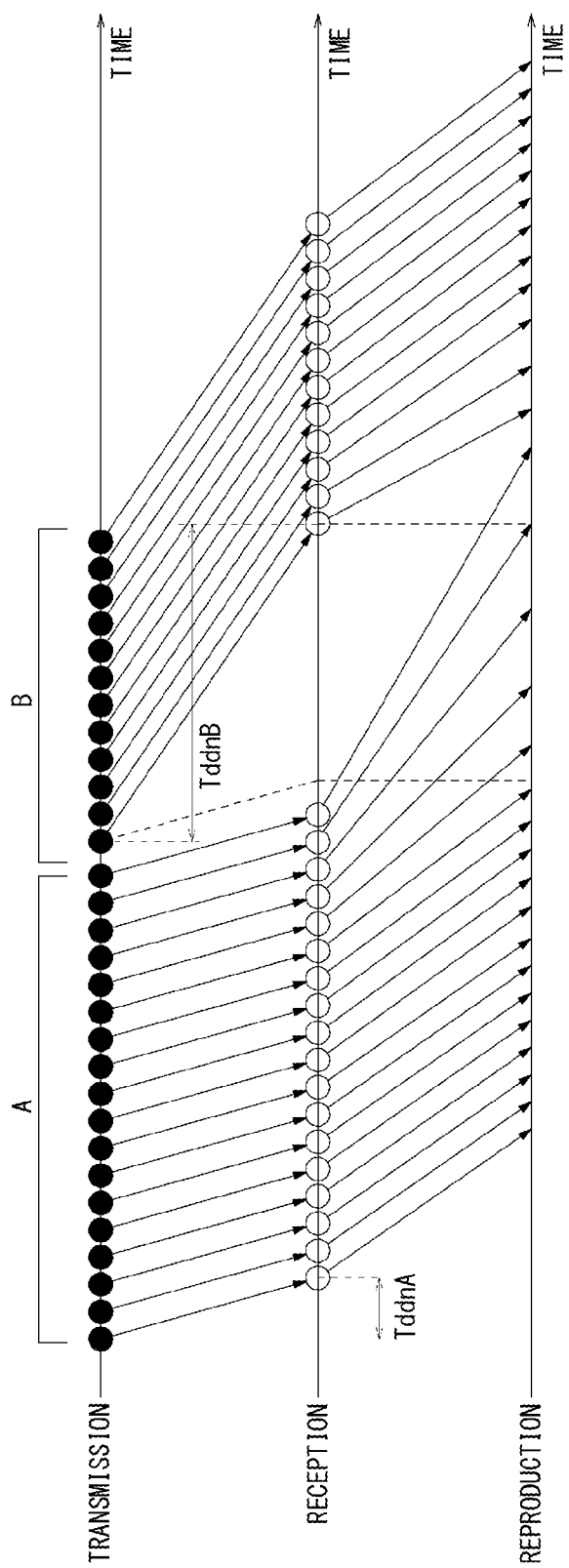
FIG. 15 is a diagram illustrating flows of the packets by the control method shown in FIG. 14.

FIG. 11 is a diagram illustrating a comparison of stretching states of voice by the reproduction speed control by the wireless communication apparatus 11 according to the present invention when the packets are reproduced at the standard reproduction speed (original voice) and at the constant speed of 0.9×. For each reproduction speed in FIG. 11, upper parts show the voice period and the lower parts show the silent period. Hatched areas in the voice periods show stretched periods of the original voice as a result of slow reproduction in accordance with the 0.9× speed and the present embodiment.

As shown in FIG. 11, the case of 0.9× speed and the present embodiment have the same slow reproduction periods. However, in the case of 0.9× speed, packets are reproduced at the constant speed of 0.9× through the entire slow reproduction period. It thus causes the extended periods in every voice periods. In contrast, for reproduction at the reproduction speed according to the present embodiment, since large extension is made because the silent period up to 700 ms is extended, there is no extended period in the voice period at an end of the slow reproduction period.

As set forth above, according to the wireless communication apparatus 11 of the present embodiment, in order to slow the reproduction speed at handover, it determines whether the packets reproduced are voice packets or non-voice packets. If the packets are non-voice packets, the silent period is appropriately extended and the reproduction speed is controlled in a special manner. Thereby, it is possible to bring the reproduction speed of the voice period close to the standard reproduction speed, without giving the hearer the sense of unease because of a long silent period. Accordingly, it enables handover from the first wireless communication network 15 to the second wireless communication network 16 without deteriorating reproduction quality and real-time property.

It is to be understood that the present invention is not limited to the above embodiment but may be modified or varied in a multiple of manners. For example, although in the above embodiment it is controlled such that the number of packets in the jitter buffer 47 becomes zero at a time to start receiving the packets from the handover destination when the reproduction speed calculation unit 56 calculates the reproduction speed Vs, it is also possible to calculate the reproduction speed Vs such that the number of packets in the jitter buffer 47 is a predetermined number at the point to start receiving the packets from the handover destination. In addition, the present invention is applicable not only when executing the VoIP application but also when executing an application for real-time communication such as for streaming and reproducing multimedia data such as images and music. In such a case, the execution unit of the application is constituted of a multimedia function unit having a similar function to control the jitter buffer, instead of the telephone function unit. Moreover, the present invention is applicable not only to handover between the wireless LAN and cdma2000 1xEV-DO but also to handover between arbitrary different wireless communication networks such as, for example, PDC (Personal Digital Cellular), W-CDMA (Wideband CDMA), PHS (Personal Handy-phone System), Bluetooth, WiMAX (Worldwide Interoperability for Microwave Access), LTE (Long Term Evolution), UMB (Ultra Mobile Broadband), IMT-Advanced, and the likes.

The invention claimed is:
1. A wireless communication apparatus comprising:
a wireless communication unit operable to perform wireless communication by connecting to a first wireless communication network and a second wireless communication network different from the first wireless communication network;
an execution unit operable to execute an application for real-time communication, which includes data of a first type and data of a second type, via the wireless communication unit;
a communication quality obtaining unit operable to obtain a communication quality indicator associated with a wireless link of the first wireless communication network during execution of the application by connecting to the first wireless communication network;
a determination unit operable to determine whether to start handover preparation from the first wireless communication network to the second wireless communication network based on the communication quality indicator obtained by the communication quality obtaining unit;
an estimation unit, when the determination unit determines to start handover preparation during execution of the application, operable to estimate a handover preparation time to start handover based on the communication quality indicator obtained by the communication quality obtaining unit;
a measuring unit, when the determination unit determines to start handover preparation, operable to measure a delay time of each of the first wireless communication network and the second wireless communication network; and
a control unit operable to control reproduction of the application executed by the execution unit, wherein the execution unit comprises a jitter buffer operable to absorb jitter of received data, and a jitter buffer monitoring unit operable to monitor an amount of data in the jitter buffer and a type of data to be reproduced from the jitter buffer, and, in operation:
the control unit controls the application, if the type of the data monitored by the jitter buffer monitoring unit is the first type, to reproduce the data of the first type at a reproduction speed calculated based on the handover preparation time estimated by the estimation unit, the delay time of each of the first wireless communication network and the second wireless communication network measured by the measuring unit, the amount of the data in the jitter buffer monitored by the jitter buffer monitoring unit and an elapsed time after start of the handover preparation and, if the type of the data monitored by the jitter buffer monitoring unit is the second type, to reproduce the data of the second type at a reproduction speed in accordance with a continuous period of the data, and
the control unit compares the delay time of the first wireless communication network and the delay time of the second wireless communication network and, if the delay time of the second wireless communication network is longer than the delay time of the first wireless communication network by a predetermined time or longer, the control unit slows down the reproduction speed of the data of the first type.

2. The wireless communication apparatus according to claim 1, wherein, in operation, the control unit slows down the reproduction speed of the data of the first type after starting handover preparation.

3. The wireless communication apparatus according to claim 1, wherein, in operation, the control unit, if the type of the data monitored by the jitter buffer monitoring unit is the first type, calculates the reproduction speed such that the amount of data in the jitter buffer becomes zero at a time to start receiving data from the second wireless communication network.

4. The wireless communication apparatus according to claim 1, wherein, in operation, the control unit, if the type of the data monitored by the jitter buffer monitoring unit is the second type, reproduces the data by extending the continuous period of the data depending on the continuous period.

5. The wireless communication apparatus according to claim 1, wherein the application for real time communication comprises a voice over internet protocol (VoIP) application.

6. The wireless communication apparatus according to claim 1, wherein the communication quality indicator comprises a received signal strength indicator (RSSI).

7. The wireless communication apparatus according to claim 1, wherein data of the first type comprises voice packets.

8. The wireless communication apparatus according to claim 1, wherein data of the second type comprises non-voice packets.

9. The wireless communication apparatus according to claim 1, wherein one of the wireless networks comprises one of following types of networks: a wireless LAN; cdma2000 1xEV-DO; personal digital cellular (PDC); W-CDMA (Wideband CDMA); Personal Handy-phone System (PHS); Bluetooth; Worldwide Interoperability for Microwave Access (WiMAX); Long Term Evolution (LTE); Ultra Mobile Broadband (UMB); and, IMT-Advanced.

10. A method for wireless communication, comprising:
performing wireless communication by connecting to a first wireless communication network and a second wireless communication network different from the first wireless communication network;
executing an application for real-time communication, which includes data of a first type and data of a second type;
obtaining a communication quality indicator associated with a wireless link of the first wireless communication network during execution of the application by connecting to the first wireless communication network;
determining whether to start handover preparation from the first wireless communication network to the second wireless communication network based on the obtained communication quality indicator;
estimating a handover preparation time to start handover based on the obtained communication quality indicator;
measuring a delay time of each of the first wireless communication network and the second wireless communication network;
if the type of data being monitored in association with a jitter buffer is of the first type, controlling reproduction of the application to reproduce the data of the first type at a reproduction speed calculated based on the estimated handover preparation time, the measured delay time of each of the first wireless communication network and the second wireless communication network, the amount of the data in the jitter buffer, and an elapsed time after start of the handover preparation and, if the type of the data being monitored in association with the jitter buffer is of the second type, controlling reproduction of the application to reproduce the data of the second type at a reproduction speed in accordance with a continuous period of the data; and
comparing the delay time of the first wireless communication network and the delay time of the second wireless communication network and, if the delay time of the second wireless communication network is longer than the delay time of the first wireless communication network by a predetermined time or longer, slowing down the reproduction speed of the data of the first type.

11. The method according to claim 10, further comprising slowing down the reproduction speed of the data of the first type after starting handover preparation.

12. The method according to claim 10, wherein, if the type of the data being monitored in the jitter buffer is of the first type,
calculating the reproduction speed such that the amount of data in the jitter buffer becomes zero at a time to start receiving data from the second wireless communication network.

13. The method according to claim 10, further comprising:
if the type of data monitored in association with the jitter buffer is of the second type, reproducing the data by extending the continuous period of the data depending on the continuous period.

14. The method according to claim 10, wherein the application for real time communication comprises a voice over internet protocol (VoIP) application.

15. The method according to claim 10, wherein the communication quality indicator comprises a received signal strength indicator (RSSI).

16. The method according to claim 10, wherein data of the first type comprises voice packets.

17. The method according to claim 10, wherein data of the second type comprises non-voice packets.

18. The method according to claim 10, wherein one of the wireless networks comprises one of following types of networks: a wireless LAN; cdma2000 1xEV-DO; personal digital cellular (PDC); W-CDMA (Wideband CDMA); Personal Handy-phone System (PHS); Bluetooth; Worldwide Interoperability for Microwave Access (WiMAX); Long Term Evolution (LTE); Ultra Mobile Broadband (UMB); and, IMT-Advanced.

* * * * *